(12) United States Patent
Ehre

(10) Patent No.: US 11,118,941 B2
(45) Date of Patent: Sep. 14, 2021

(54) LINEAR MEASUREMENT IN PISTON-CYLINDER ARRANGEMENTS

(71) Applicant: Stabilus GmbH, Koblenz (DE)

(72) Inventor: Thomas Ehre, Saarlouis (DE)

(73) Assignee: STABILUS GMBH, Koblenz (DE)

(*) Notice: Subject to any disclaimer, the term of this patent is extended or adjusted under 35 U.S.C. 154(b) by 76 days.

(21) Appl. No.: 16/518,399

(22) Filed: Jul. 22, 2019

(65) Prior Publication Data

US 2020/0025589 A1    Jan. 23, 2020

(30) Foreign Application Priority Data

Jul. 23, 2018    (DE) .................... 10 2018 117 775.5

(51) Int. Cl.
  *G01D 5/24*    (2006.01)
  *F16F 9/00*    (2006.01)
  *F16F 9/32*    (2006.01)

(52) U.S. Cl.
  CPC ............... *G01D 5/24* (2013.01); *F16F 9/00* (2013.01); *F16F 9/3292* (2013.01)

(58) Field of Classification Search
  CPC .......... G01D 5/24; G01D 5/243; G01D 5/241; G01D 5/2412; G01B 7/003; G01B 7/02; G01B 7/14
  See application file for complete search history.

(56) References Cited

U.S. PATENT DOCUMENTS 4,577,509 A * 3/1986 Moser ................. F15B 15/2853
                                                    267/64.11
4,788,489 A * 11/1988 Kobayashi ....... B60G 17/01933
                                                    280/735

(Continued)

FOREIGN PATENT DOCUMENTS

DE    202006004598 U    8/2007
DE    102007049445 A1   4/2009

(Continued)

OTHER PUBLICATIONS

74434 Monroe Magnum 70 Class 7-8 Truck and Bus Shock Absorber, accessed Jan. 1, 2021 at https://www.stengelbros.net/74434-Monroe-Magnum-70-Class-7-8-Truck-and-Bus-Shock-Absorber_p_6413.html (Year: 2021).*

(Continued)

*Primary Examiner* — Daniel R Miller
(74) *Attorney, Agent, or Firm* — Kilpatrick Townsend & Stockton LLP

(57) ABSTRACT

The invention relates to a method for measuring the position of a piston-cylinder arrangement, said method comprising: providing the piston-cylinder arrangement, providing an electrical circuit unit, applying a DC voltage (Vcc) to the piston-cylinder arrangement, sensing a capacitance (C) of the piston-cylinder arrangement as an input variable for the electrical circuit unit, generating a pulsed DC voltage (Vcc) by means of the electrical circuit unit on the basis of the sensed capacitance (C) of the piston-cylinder arrangement, providing a measuring unit for measuring a frequency ($F_0$, $F_1$) of the pulsed DC voltage (Vcc) generated, determining a frequency difference (DF) between the frequency ($F_0$) of the pulsed DC voltage (Vcc) before displacement of the piston within the cylinder and the frequency ($F_1$) of the pulsed DC voltage (Vcc) after displacement of the piston within the cylinder, determining a displacement distance of the piston within the cylinder on the basis of the frequency difference (DF).

15 Claims, 1 Drawing Sheet

(56) References Cited

U.S. PATENT DOCUMENTS

| | | | | |
|---|---|---|---|---|
| 4,961,055 A | * | 10/1990 | Habib | G01D 5/2412 |
| | | | | 324/662 |
| 5,125,681 A | * | 6/1992 | Brackette, Jr. ... | B60G 17/01933 |
| | | | | 188/266.1 |
| 5,458,219 A | * | 10/1995 | Anderson | F16F 9/092 |
| | | | | 188/315 |
| 2015/0114220 A1 | * | 4/2015 | Dropmann | F15B 15/2815 |
| | | | | 92/5 R |

FOREIGN PATENT DOCUMENTS

| | | |
|---|---|---|
| DE | 202008010230 U1 | 12/2009 |
| DE | 102016005539 A1 | 11/2017 |

OTHER PUBLICATIONS

Monroe Shocks and Struts, 2011 Mounting and Length Specifications, 2011, accessed Jan. 1, 2021 at http://partshutinc.com/08_MountingLengthSheet.pdf (Year: 2011).*

German Application No. 10 2018 117 775.5, German Search Report dated Apr. 23, 2019, 13 pages.

* cited by examiner

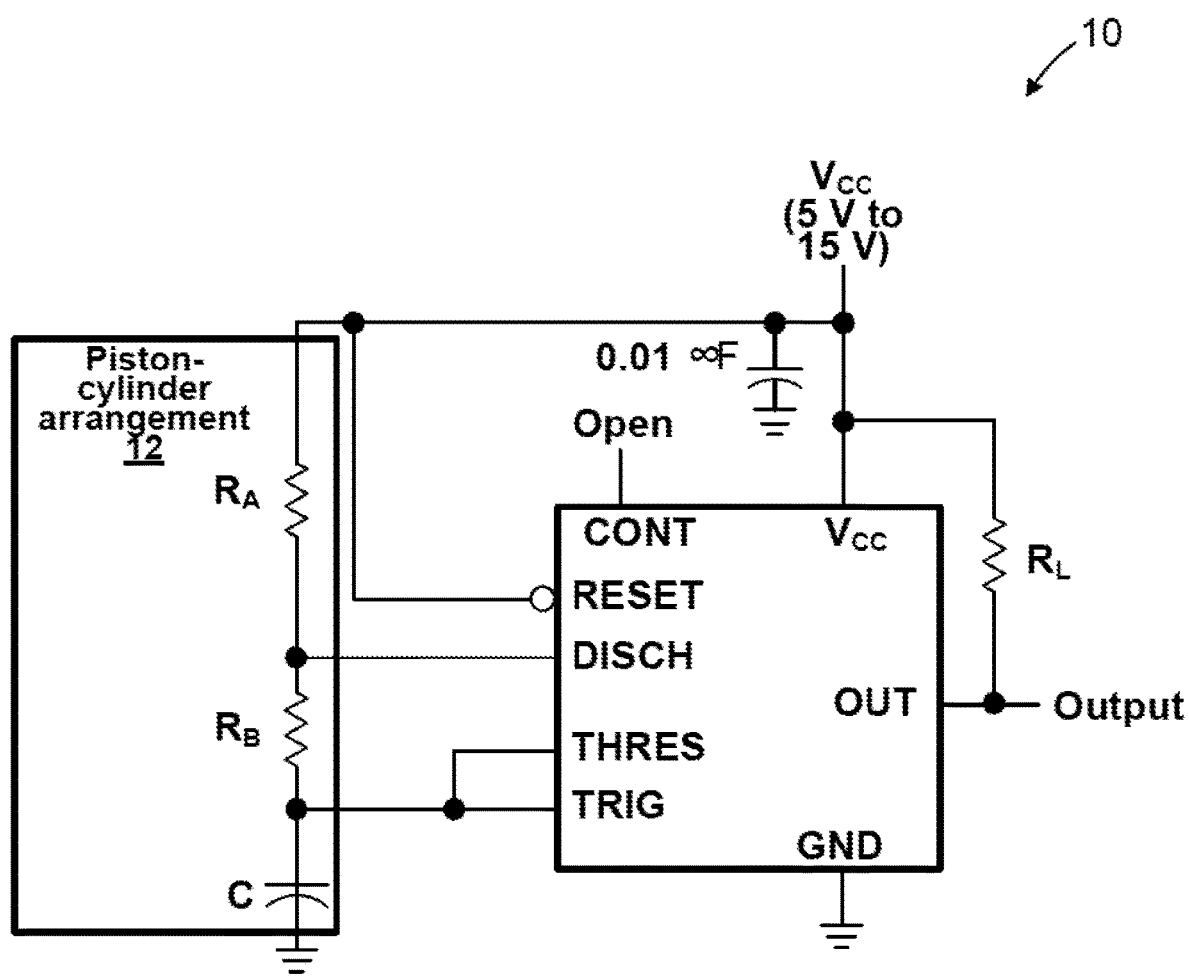

LINEAR MEASUREMENT IN PISTON-CYLINDER ARRANGEMENTS

CROSS REFERENCE TO RELATED APPLICATION

This application claims priority to German Patent Application No. 10 2018 117 775.5, filed in Germany on Jul. 23, 2018, the entire contents of which are hereby incorporated herein by this reference.

The invention relates to a method for measuring the position of a piston-cylinder arrangement, which comprises a cylinder and a piston that is movable within the cylinder.

The applicant has for many years been successful in selling piston-cylinder arrangements, e.g., hydraulically- or dynamically-driven piston-cylinder arrangements. In this context, particularly fields in which piston-cylinder arrangements are used as actuators, hence in which a piston that is displaceable within a cylinder is displaced as a result of an increase in the ambient pressure in the working area of the cylinder adjoining the piston, it is a challenge to sense a change in the extension of the piston-cylinder arrangement in a rapid and precise manner.

A variety of approaches have been attempted for this purpose, but none of them has been practical enough to be conceivable for implementation on a series production level.

In an initial approach, AC voltages were applied to the piston-cylinder arrangements. The AC voltage was used to determine a change in the extension of the respective piston-cylinder arrangement using a complex measuring means, in particular using bridge circuits. A measurement of this kind lasts quite a long time, typically in the range of 1 to 2 seconds, which is far too long for conventional use in piston-cylinder arrangements of this kind because said arrangements are unable to be used during this time. The necessary components are nevertheless overly complex and cost-intensive. Furthermore, in the field of motor vehicles, an AC voltage must first be generated from the available DC voltage, which results in the complexity increasing even further.

In a second approach, a piston-cylinder arrangement was charged via a DC voltage, and multimeters were used to measure the time elapsed between the start of charging and when the piston-cylinder arrangement was completely charged. The change in extension of the piston-cylinder arrangement can then be deduced by way of the time measured. Furthermore, it is absolutely necessary in this kind of measurement for the piston-cylinder arrangement, which is acting as a condenser, to be completely discharged before being charged because the results of the measurement would otherwise be distorted. This requirement is likewise often unable to be implemented in the motor vehicle field in particular.

Therefore, the object of the present invention is to provide a method and a corresponding piston-cylinder arrangement, by means of which a change in the extension of a corresponding piston-cylinder arrangement can be determined in a straightforward and rapid manner, i.e., in a matter of milliseconds.

This object will be achieved according to the invention by means of a method for measuring the position of a piston-cylinder arrangement, which comprises a cylinder and a piston movable within the cylinder, said method comprising:
providing the piston-cylinder arrangement,
providing an electrical circuit unit,
applying a DC voltage to the piston-cylinder arrangement,
sensing a capacitance of the piston-cylinder arrangement as an input variable for the electrical circuit unit,
generating a pulsed DC voltage by means of the electrical circuit unit on the basis of the sensed capacitance of the piston-cylinder arrangement,
providing a measuring unit used to measure a frequency of the pulsed DC voltage generated,
determining a frequency difference between the frequency of the pulsed DC voltage before displacement of the piston within the cylinder and the frequency of the pulsed DC voltage after displacement of the piston within the cylinder,
determining a displacement distance of the piston within the cylinder on the basis of the frequency difference.

The inventors of this patent application have discovered that the frequency change during a change in the extension of the piston-cylinder arrangement is proportional to the change in the extension of the piston-cylinder arrangement. Even if the frequency difference itself is not intended to provide an indication of the actual position of or the change in the extension of the piston-cylinder arrangement, the proportionality of the frequency change can provide this indication.

In order to generate the frequency difference, voltage can be applied to the piston-cylinder arrangement and to an electrical circuit unit in the form of a pulse generator, for example a logic module. By way of the change in capacitance, the pulse frequency can then be modulated so that the frequency difference can be obtained at the output of the pulse generator.

By means of the method according to the invention, the complex, large, and expensive components necessary for alternating current circuits, for example bridge circuits, can be omitted, with the result that the method according to the invention enables a more economical and less complex unit, which can consequently have less susceptibility to error and a smaller installation space.

In addition, the readout time can be drastically reduced in comparison to previous approaches that use direct current, thus allowing a change in the extension of a piston-cylinder arrangement to be sensed even during operation of the piston-cylinder arrangement.

It should be noted at this juncture be noted that the expression "position" can mean both a change in the extension of the piston-cylinder arrangement with respect to an initial position and a current position of the piston-cylinder arrangement.

In a refinement of the invention, a piston rod can be connected to the piston in an electrically conductive manner and the DC voltage applied to the cylinder and to the piston rod. As a result, the location of the piston within the cylinder can be unmistakably sensed by way of the capacitance of the piston-cylinder arrangement. An electrical connection to the cylinder and to the piston rod can, for example, be provided on both longitudinal ends of the piston-cylinder arrangement.

Advantageously, a piston seal and/or piston guide and/or piston rod seal and/or piston rod guide can be designed in an electrically insulating manner. It can thereby be ensured that the position of or the change in the extension of the piston-cylinder arrangement is able to be measured correctly. In particular, it can thus be prevented that an erroneous capacitance is determined for the piston-cylinder arrangement.

An outer tube can be arranged on the cylinder and surround the cylinder. The outer tube can shield the piston-cylinder arrangement against any unwanted electrical charge or discharge that may, for example, be generated via the existing electrical field by a user placing their hand on the piston-cylinder arrangement or by a medium, e.g. water, surrounding the piston-cylinder arrangement.

The capacitances to be measured can be in the range from 0.5 pF to 50 pF, in particular in the range from 1 pF to 25 pF.

In one embodiment of the present invention, the piston-cylinder arrangement can be a gas spring or a damper. A gas spring of this kind or a damper of this kind can, for example, be arranged on a chair or a folding arrangement in a vehicle.

In a second aspect, the present invention relates to a device for sensing a change in the extension of a piston-cylinder arrangement, in particular according to the inventive method, said aspect comprising:

the piston-cylinder arrangement, which comprises a cylinder and a piston that is movable within the cylinder,
an electrical circuit unit, which is configured to apply a DC voltage to the piston-cylinder arrangement, and
a capacitance determination unit, which is configured to determine the capacitance of the piston-cylinder arrangement, whereby the electrical circuit unit is configured to generate a pulsed DC voltage on the basis of the capacitance of the piston-cylinder arrangement sensed, said device further comprising:
a measuring unit, which is configured to measure a frequency of the pulsed DC voltage generated, and
an evaluation unit, which is configured to determine a frequency difference between the frequency of the pulsed DC voltage before displacement of the piston within the cylinder and the frequency of the pulsed DC voltage after displacement of the piston within the cylinder, and which is further configured to determine a displacement distance of the piston within the cylinder on the basis of the frequency difference.

It should at this juncture be expressly pointed out that the features and advantages of the method according to the invention may also be applicable to or be suitable for use in the device according to the invention and vice versa.

In one embodiment of the device according to the invention, a piston rod can be connected to the piston in an electrically conductive manner, and the electrical circuit unit can be configured to apply the DC voltage to the cylinder and to the piston rod. An electrical circuit unit that is also configured to provide a DC voltage to the piston-cylinder arrangement can also avoid the arrangement of additional components, thereby further reducing the installation space for the piston-cylinder arrangement according to the invention.

Advantageously, a piston seal and/or piston guide and/or piston rod seal and/or piston rod guide can be designed in an electrically insulating manner. As mentioned earlier, it can thereby be ensured that the position of or the change in the extension of the piston-cylinder arrangement is able to be measured correctly. In particular, it can thus be prevented that an erroneous capacitance is determined for the piston-cylinder arrangement.

An outer tube can be arranged on the cylinder and surround the cylinder. The advantages of a corresponding outer tube should also be pointed out in relation to the device according to the invention. Said outer tube can shield the piston-cylinder arrangement against any unwanted electrical charge or discharge that may, for example, be generated via the existing electrical field due to a user placing their hand on the piston-cylinder arrangement or due to a medium, e.g. water, surrounding the piston-cylinder arrangement.

The present invention is described hereinafter with reference to the accompanying drawing, in which:

FIG. 1 shows an electrical circuit unit that is connected to a piston-cylinder arrangement according to the present invention.

FIG. 1 illustrates an electrical circuit unit (generally referred to using reference numeral 10) as provided by the device according to the invention. A DC voltage Vcc, which is also applied to the piston-cylinder arrangement 12 that is connected to electrical connection C, is applied to the electrical circuit unit 10. The piston-cylinder arrangement 12 is charged via resistors $R_A$ and $R_B$ and is discharged only via resistor $R_B$, in which case the discharge voltage of the piston-cylinder arrangement 12 is fed into the input DISCH of the electrical circuit unit 10.

The following formulas are used to calculate the input voltage at the input DISCH with respect to a frequency $F_1$ that is emitted at the OUTPUT.

Calculation of the output high-level duration $t_H$ and the output low-level duration $t_L$:

$$t_H = 0.693(R_A + R_B)C \quad (1)$$

$$t_L = 0.693(R_B)C \quad (2)$$

further:

$$\text{Period} = t_H + t_L = 0.693\,(R_A + 2R_B)\,C \quad (3)$$

$$\text{Frequency} \approx \frac{1.44}{(RA + 2RB)\,C} \quad (4)$$

$$\text{OUTPUT driver working cycle} = \frac{t_L}{t_H + t_L} = \frac{R_B}{R_A + 2R_B} \quad (5)$$

$$\text{OUTPUT waveform working cycle} = \frac{t_H}{t_{H+L}} = 1 - \frac{R_B}{R_{A+2R_B}} \quad (6)$$

$$\text{Low-to-high ratio} = \frac{t_L}{t_H} = \frac{R_B}{R_A + R_B} \quad (7)$$

The frequency $F_1$ can then be compared to a frequency $F_0$ that was sensed earlier. A frequency difference can then be determined via the difference between the frequencies F1 and F0.

By way of the proportionality discovered by the inventors between the frequency difference DF and the change in the extension of the piston-cylinder arrangement 12, the change in the extension thereof can subsequently be determined.

The invention claimed is:
1. A method for measuring a position of a piston-cylinder arrangement, which comprises a cylinder and a piston movable within the cylinder, said method comprising:
providing the piston-cylinder arrangement,
providing an electrical circuit unit configured to sense a capacitance of the piston-cylinder arrangement,
applying a DC voltage to the piston-cylinder arrangement and to the electrical circuit unit,
sensing the capacitance of the piston-cylinder arrangement as an input variable for the electrical circuit unit,
generating a pulsed DC voltage by the electrical circuit unit on the basis of the sensed capacitance of the piston-cylinder arrangement,
providing a measuring unit used to measure a frequency of the pulsed DC voltage generated,
determining a frequency difference between the frequency of the pulsed DC voltage before displacement of the piston within the cylinder and the frequency of the pulsed DC voltage after displacement of the piston within the cylinder, and determining a displacement distance of the piston within the cylinder on the basis of the frequency difference.

2. The method according to claim 1, wherein a piston rod is connected to the piston in an electrically conductive manner, and wherein the DC voltage is applied to the cylinder and to the piston rod.

3. The method according to claim 1, wherein a piston seal and/or piston guide and/or piston rod seal and/or piston rod guide is designed in an electrically insulating manner.

4. The method according to claim 1, wherein an outer tube is arranged on the cylinder and surrounds the cylinder.

5. The method according to claim 1, wherein capacitances to be measured are in the range from 0.5 pF to 50 pF or in the range from 1 pF to 25 pF.

6. The method according to claim 1, wherein the piston-cylinder arrangement is a gas spring or a damper.

7. The method according to claim 1, wherein the pulsed DC voltage is generated on the basis of a discharge voltage that indicates the determined capacitance.

8. The method according to claim 1, wherein the DC voltage is applied to a resistor of the piston-cylinder arrangement.

9. A device for sensing a change in an extension of a piston-cylinder arrangement, the device comprising:
   the piston-cylinder arrangement, which comprises a cylinder and a piston that is movable within the cylinder, and
   an electrical circuit unit comprising a capacitance determination unit, which is configured to determine a capacitance of the piston-cylinder arrangement on the basis of a DC voltage, wherein the DC voltage is applied to the piston-cylinder arrangement and the electric circuit unit,
   wherein the electrical circuit unit is configured to generate a pulsed DC voltage on the basis of the determined capacitance of the piston-cylinder arrangement,
   the device further comprising:
   a measuring unit, which is configured to measure a frequency of the pulsed DC voltage generated, and
   an evaluation unit, which is configured to determine a frequency difference between the frequency of the pulsed DC voltage before displacement of the piston within the cylinder and the frequency of the pulsed DC voltage after displacement of the piston within the cylinder, and which is further configured to determine a displacement distance of the piston within the cylinder on the basis of the frequency difference.

10. The device according to claim 9, wherein a piston rod is connected to the piston in an electrically conductive manner, and wherein the electrical circuit unit is configured to apply the DC voltage to the cylinder and to the piston rod.

11. The device according to claim 9, wherein a piston seal and/or piston guide and/or piston rod seal and/or piston rod guide is designed in an electrically insulating manner.

12. The device according to claim 9, wherein an outer tube is arranged on the cylinder and surrounds the cylinder.

13. The device according to claim 9, wherein capacitances (C) to be measured are in the range from 0.5 pF to 50 pF.

14. The device according to claim 13, wherein the capacitances (C) to be measured are in the range from 1 pF to 25 pF.

15. The device according to claim 9, wherein the piston-cylinder arrangement is a gas spring or a damper.

* * * * *